United States Patent
Park et al.

(10) Patent No.: US 9,323,698 B2
(45) Date of Patent: Apr. 26, 2016

(54) SYSTEM AND METHOD FOR TRANSMITTING USB DATA OVER A DISPLAYPORT TRANSMISSION LINK

(75) Inventors: Ji Park, Morgan Hill, CA (US); Prashant Shamarao, Duluth, GA (US)

(73) Assignee: Synaptics Incorporated, San Jose, CA (US)

( * ) Notice: Subject to any disclaimer, the term of this patent is extended or adjusted under 35 U.S.C. 154(b) by 261 days.

(21) Appl. No.: 13/241,127

(22) Filed: Sep. 22, 2011

(65) Prior Publication Data

US 2013/0080665 A1    Mar. 28, 2013

(51) Int. Cl.
| | |
|---|---|
| G06F 3/00 | (2006.01) |
| G06F 13/14 | (2006.01) |
| G09G 5/00 | (2006.01) |
| H04L 29/08 | (2006.01) |
| H04L 12/40 | (2006.01) |
| H04L 29/06 | (2006.01) |
| G06F 13/42 | (2006.01) |

(52) U.S. Cl.
CPC ............ *G06F 13/14* (2013.01); *G06F 13/4265* (2013.01); *G09G 5/006* (2013.01); *H04L 12/4013* (2013.01); *H04L 67/2823* (2013.01); *H04L 69/08* (2013.01); *G09G 2370/04* (2013.01); *G09G 2370/045* (2013.01); *G09G 2370/10* (2013.01)

(58) Field of Classification Search
CPC ...... G06F 3/14; G09G 5/006; G09G 2370/04; G09G 2370/045; G09G 2370/12
USPC ..................................... 710/60; 370/375, 463
See application file for complete search history.

(56) References Cited

U.S. PATENT DOCUMENTS

| | | | |
|---|---|---|---|
| 7,904,620 B2 | 3/2011 | Yao et al. | |
| 8,068,485 B2 * | 11/2011 | Kobayashi | 370/389 |
| 8,151,018 B2 | 4/2012 | Mohanty et al. | |
| 2007/0201492 A1 * | 8/2007 | Kobayashi | 370/395.64 |
| 2008/0172501 A1 | 7/2008 | Goodart et al. | |
| 2008/0205519 A1 * | 8/2008 | Goodart et al. | 375/240.12 |
| 2009/0187686 A1 * | 7/2009 | Goodart et al. | 710/72 |
| 2009/0278763 A1 * | 11/2009 | Zeng et al. | 345/1.1 |
| 2010/0183004 A1 * | 7/2010 | Kobayashi | G06F 13/385 370/389 |

(Continued)

OTHER PUBLICATIONS

Video Electronics Standard Association (VESA) DisplayPort Standard, Version 1.1, Mar. 19, 2007, 228 pages.

(Continued)

*Primary Examiner* — Ernest Unelus
(74) *Attorney, Agent, or Firm* — Osha Liang LLP

(57) ABSTRACT

A data transmission system is provided. The data transmission system includes a source device having a source device controller and a register and a sink device having a sink device controller. The data transmission system also includes a transmission link coupling the source device and the sink device. The transmission link includes a unidirectional main line having a plurality of main link channels, a bidirectional auxiliary line configured to transmit data between the source device and the sink device at a first data rate, and a unidirectional interrupt line. The transmission link is configured to transmit data from the source device to the sink device over one of the main link lines at a second data rate and to transmit data from the sink device to the source device over the auxiliary line at the second data rate. The transmission link may comply with the DisplayPort standard, and the data may be transmitted in accordance with the USB standard.

24 Claims, 6 Drawing Sheets

(56) References Cited

U.S. PATENT DOCUMENTS

| | | |
|---|---|---|
| 2010/0271389 A1 | 10/2010 | Douglas et al. |
| 2010/0272102 A1* | 10/2010 | Kobayashi .................. 370/389 |
| 2011/0087806 A1 | 4/2011 | Mohanty et al. |
| 2012/0079162 A1 | 3/2012 | Jaramillo |
| 2012/0146989 A1* | 6/2012 | Whitby-Strevens ......... 345/213 |
| 2012/0317607 A1* | 12/2012 | Wyatt et al. .................. 725/127 |

OTHER PUBLICATIONS

VESA DisplayPort Standard, Version 1, Revision 1a, Jan. 11, 2008.
VESA DisplayPort Standard, Version 1, Revision 2, Jan. 5, 2010.

* cited by examiner

SYSTEM AND METHOD FOR TRANSMITTING USB DATA OVER A DISPLAYPORT TRANSMISSION LINK

BACKGROUND

1. Technical Field

The present disclosure is related to transmitting data over a data transmission system. In particular, the present disclosure is related to a system and method for transmitting Universal Serial Bus (USB) data over a DisplayPort data transmission link.

2. Discussion of Related Art

As digital data becomes the standard for storing information, the need to transfer the data between electronic digital devices increases. Currently, electronic devices rely on numerous interfaces and specifications for transmitting information between electronic devices. These interfaces and specifications include Universal Serial Bus (USB), Peripheral Component Interconnection (PCI) express, IEEE-1394, and Thunderbolt. In addition, specific interfaces and specifications have been developed that have been optimized for the transmission of audio and video (A/V) data, and these include Digital Visual Interface (DVI), High-Definition Multimedia Interface (HDMI), Video Graphics Array (VGA), and DisplayPort. These primarily A/V data interfaces and specifications are often limited in their data transmission rates and, thus, usually are not useful for large data transfers between devices.

Due to the numerous specifications and interfaces, it is important that the specifications and interface be interoperable with each other. Interoperability allows devices to be multifunctional and more highly configurable. For example, many monitors are connected to a processing device using a VGA or DVI link, but also provide USB ports to allow for the transmission of USB data over the VGA or DVI link. Consequently, in order to allow such applications as well as docking and thin clients, it is important to provide interoperability between different data transmission interfaces and specifications.

However, the different data transmission interfaces and specifications often have different specified data transmission protocols and specified data rates. These differences can inhibit the transmission of data designed for transmission according to one specification using a connection that is designed for another specification. This renders the two specifications interoperable and limits the functionality of an electronic device designed according to either of the two standards. What is needed is an improved method and system for transmitting data designed for transmission according to one specification using a connection that is designed for another specification.

SUMMARY

Consistent with some embodiments, there is provided a method of transmitting data between a source device coupled to a sink device. The method includes receiving a first instruction to transmit data between the source device and the sink device at a first data rate, transmitting data from the source device to the sink device at the first data rate over a unidirectional line, and transmitting data from the sink device to the source device at the first data rate over a bidirectional line, wherein the bidirectional line typically transmits data at a second data rate that is slower than the first data rate.

Consistent with other embodiments, there is also provided a method for transmitting Universal Serial Bus (USB) data over a DisplayPort link coupling a sink device to a source device. The method includes receiving a first instruction at the source device to transmit the USB data over the DisplayPort link, transmitting the USB data over a fast auxiliary line of the DisplayPort link from the source device to the sink device at a first data rate, and transmitting the USB data over the fast auxiliary line from the sink device to the source device at the first data rate. The USB data transmission between the source device and the sink device comprises alternating half duplex unidirectional transmission.

Consistent with some embodiments, a data transmission system is provided. The data transmission system includes a source device, the source device including a source device controller having a register and a sink device, the sink device comprising a sink device controller. The data transmission system also includes a transmission link coupling the source device and the sink device. The transmission link includes a unidirectional main line having a plurality of main link channels, a bidirectional auxiliary line, the bidirectional auxiliary line configured to transmit data between the source device and the sink device at a first data rate, and a unidirectional interrupt line, wherein the transmission link is configured by the source device controller to transmit data from the source device to the sink device over one of the plurality of main link lines at a second data rate and to transmit data from the sink device to the source device over the auxiliary line at the second data rate in response to a first instruction written to the register.

Consistent with some embodiments, there is further provided a data transmission system. The data transmission system includes a source device, the source device including a source device controller having a register, a sink device, the sink device including a sink device controller, and a transmission link coupling the source device and the sink device. The transmission link includes a unidirectional main line having a plurality of main link lines, a bidirectional auxiliary line, and a unidirectional interrupt line, wherein the transmission link is configured by the source device controller to transmit data from the source device to the sink device over a first main link line and to transmit data from the sink device to the source device over a second main link line in response to a first instruction written to the register.

Further consistent with some embodiments, there is provided a method of transmitting data between a source device and a sink device. The method includes receiving instructions to transmit data between the source device and the sink device, configuring a first main line link of a plurality of main line links in a main line coupling the source device and the sink device to transmit data from the source device to the sink device, configuring a second main line link of the plurality of main line links to transmit data from the sink device to the source device, transmitting data from the source device to the sink device over the first main line link, and transmitting data from the sink device to the source device over the second main line link.

These and other embodiments will be described in further detail below with respect to the following figures.

Figure 1:
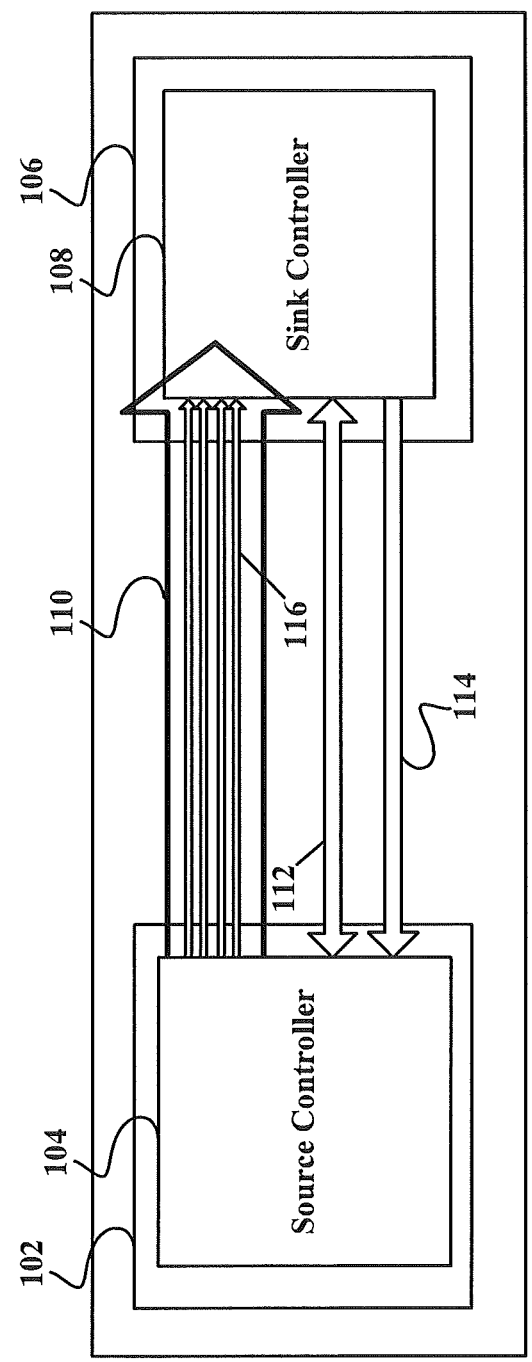
FIG. 1 is a diagram illustrating a data transmission system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

FIG. 1 is a diagram illustrating a data transmission system, consistent with some embodiments. As shown in FIG. 1, the system 100 includes a source device 102 having a source device controller 104 coupled to a sink device 106 having a sink device controller 108. The coupling comprises a plurality of links, lines, or channels, including a unidirectional main link 110, a bidirectional auxiliary line 112, and a unidirectional interrupt link 114. Unidirectional main link 110 is shown as having four main link lines 116 however, according to other embodiments, main link 110 may include more or less main link lines 116. Consistent with some embodiments, audio and video data may be transmitted between source device 102 and sink device 106 at a predetermined data rate. Further consistent with some embodiments, the predetermined data rate may be consistent with the DisplayPort standard. In addition, the coupling of source device 102 to sink device 104 may comprise a DisplayPort data transmission link.

DisplayPort is a digital multimedia interface standard set forth by the Video Electronics Standards Association (VESA). DisplayPort supports transmitting video, audio, and data signals between a source device and a sink device, such as source device 102 and sink device 106, simultaneously on a single cable including main link 110, auxiliary line 112, and interrupt link 114, also referred to as a Hot Plug Detect (HPD) link. Similar to Ethernet, Universal Serial Bus (USB) and Peripheral Component Interconnect (PCI) Express transmission standards, DisplayPort uses packetized data transmission, in particular, small ("mini") data packets with an embedded clock. According to the DisplayPort standard, main link 110 transmits audio and video data from source device 102 to sink device 106 and auxiliary line 112 transmits device management and device control data for main link 110. Consistent with some embodiments, data such as USB data, may also be bidirectionally transmitted over auxiliary line 112.

Figure 2:
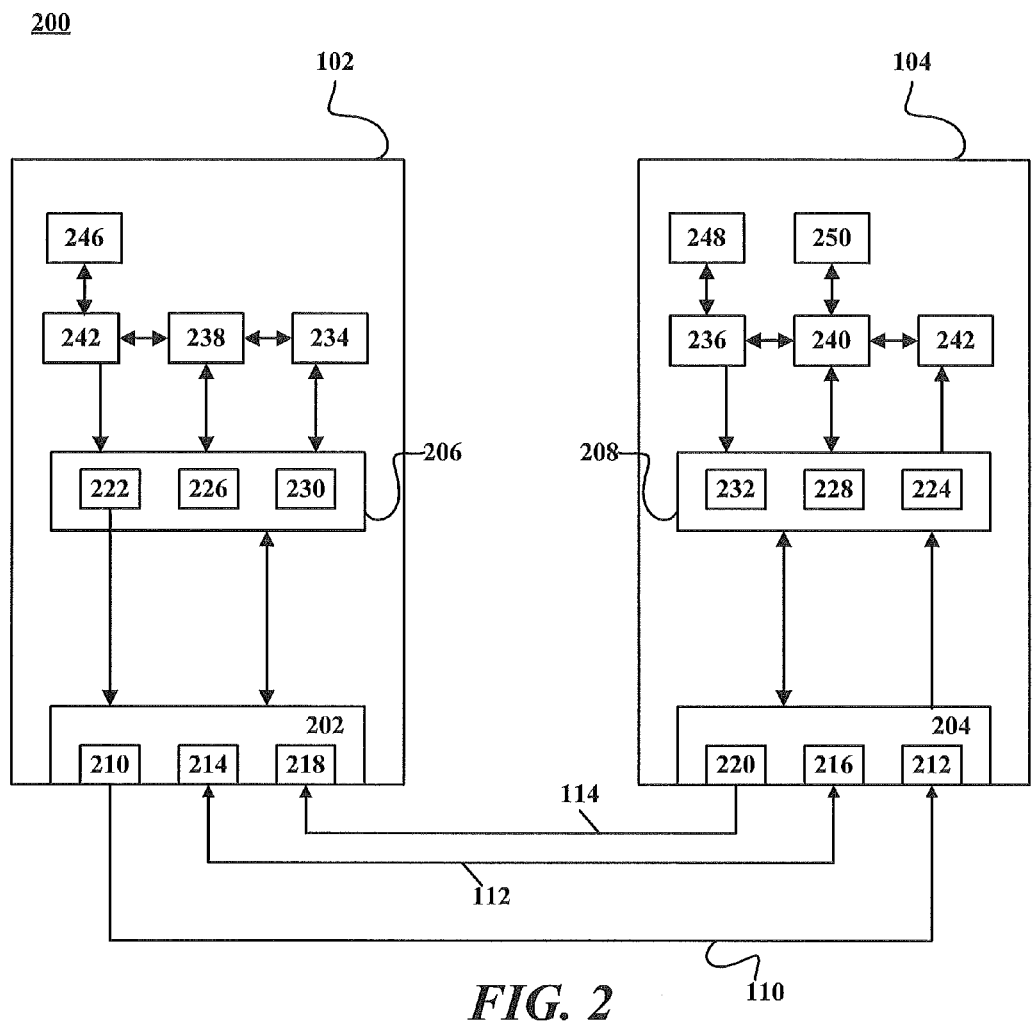
FIG. 2 is a diagram illustrating the layered architecture of data transmission system, consistent with some embodiments.

FIG. 2 is a diagram illustrating the layered architecture of data transmission system 100, consistent with some embodiments. As shown in FIG. 2, source device 102 and sink device 106 include physical layers 202 and 204 and link layers 206 and 208. Physical layers 202 and 204 include a main link 210 and 212, an auxiliary line 214 and 216, and an interrupt link 218 and 220, which may respectively be coupled or linked by main link 110, auxiliary line 112, and interrupt link 114. Link layers 206 and 208 include isochronous transport services 222 and 224, auxiliary line device services 226 and 228, and auxiliary line link services 230 and 232. Link policy makers 234 and 236 and stream policy makes 238 and 240 respectively manage the link between source device 102 and sink device 106 and the stream of data between source device 102 and sink device 106, streamed from stream source 242 to stream sink 244. Consistent with some embodiments, source device 102 and sink device 106 may each include a configuration register 246 and 248 and sink device 106 may include a device identification register 250. Configuration registers 246 and 248 may respectfully provide information regarding capabilities of source device 102 and sink device 106. Consistent with some embodiments, configuration registers 246 and 248 may correspond to DisplayPort Configuration Data (DPCD) registers. Device identification register 250 may provide additional configurations of sink device 106. Consistent with some embodiments device identification register 250 may be an Extended Display Identification Data (EDID) register or a DisplayID register.

Figure 3:
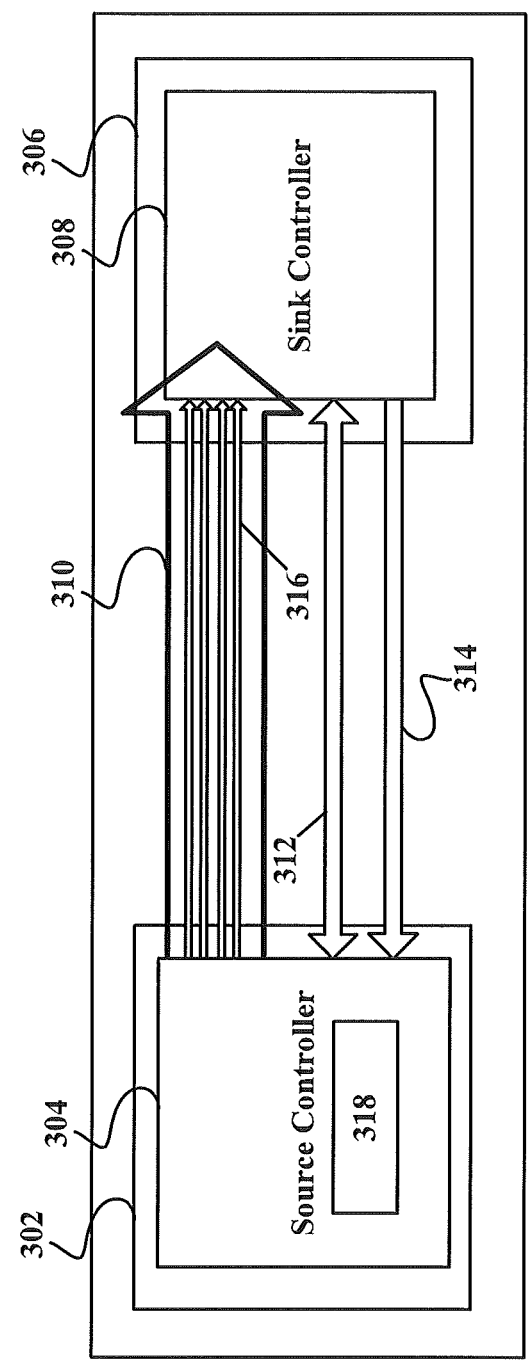
FIG. 3 is a diagram illustrating a data transmission system according to some embodiments.

FIG. 3 is a diagram illustrating a data transmission system according to some embodiments. As shown in FIG. 1, the system 300 includes a source device 302 having a source device controller 304 coupled to a sink device 306 having a sink device controller 308. The coupling comprises a plurality of links, lines, or channels, including a unidirectional main link 310, a bidirectional fast auxiliary line 312, and a unidirectional interrupt link 314. Unidirectional main link 310 is shown as having four main link lines 316 however, according to other embodiments, main link 310 may include more or less main link lines 316. Consistent with some embodiments, audio and video data may be transmitted between source device 302 and sink device 306 at a predetermined data rate. Further consistent with some embodiments, the predetermined data rate may be consistent with the DisplayPort standard. In addition, the coupling of source device 302 to sink device 306 may comprise a DisplayPort data transmission link. Source device controller 304 includes a register 318 for storing instructions and data regarding the operations of system 300 and the capabilities of source device 302. Consistent with some embodiments, system 300 corresponds to a DisplayPort transmission system and register 318 corresponds to a DisplayPort Configuration Data (DPCD) register.

Consistent with some embodiments, USB data may also be transmitted between source device 302 and sink device 306 at a data rate that corresponds to a USB revision 3.0 data rate. The USB revision 3.0 specification mandates a full-duplex data rate requirement of 5.0 Gbps. Although the DisplayPort specification currently provides for data to be unidirectionally transmitted along main link 310 at 5.4 Gbps, the DisplayPort specification only provides for data to be transmitted bidirectionally along fast auxiliary line 312 at a half-duplex data rate of 675 Mbps. Consequently, embodiments consistent with the present disclosure provide a method of transmitting USB data at a data rate mandated by the USB revision 3.0 standard over a DisplayPort connection by using one main link line 316 to transmit data at a full-duplex data rate 5.0 Gbps from source device 302 to sink device 306 and using fast auxiliary line 312 in one direction to transmit data at a full-duplex data rate of 5.0 Gbps from sink device 306 to source device 302.

Figure 4:
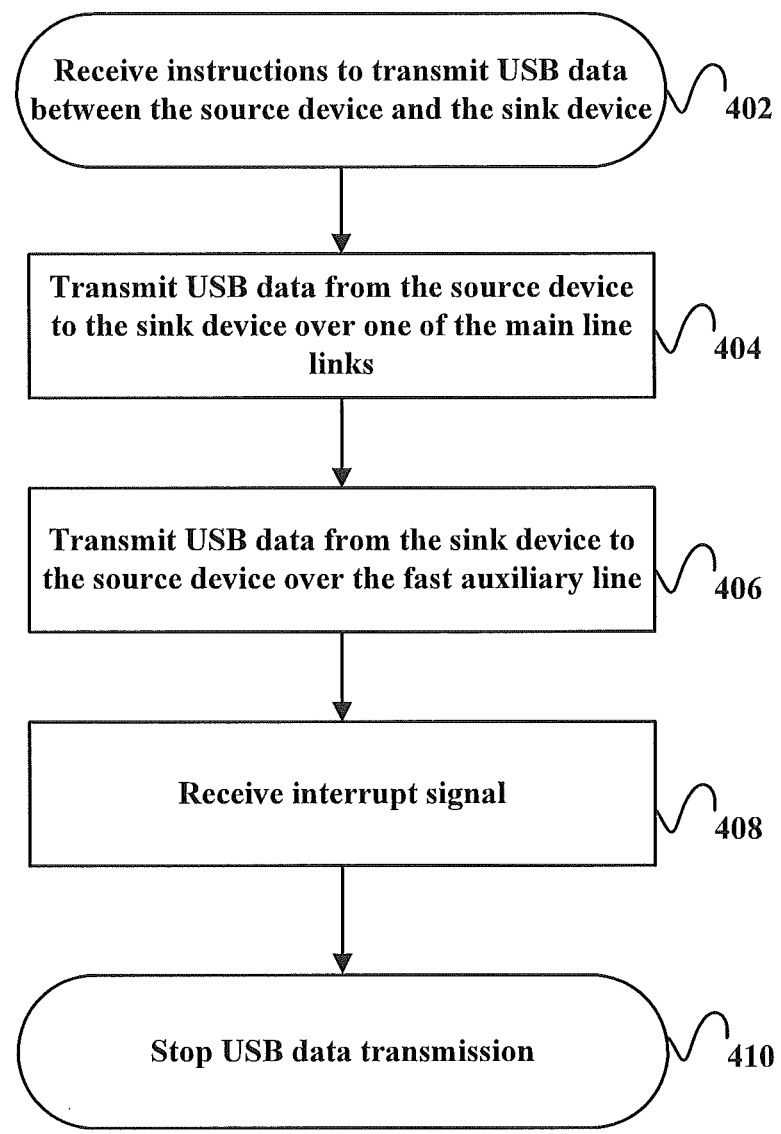
FIG. 4 is a flowchart illustrating a method of transmitting USB data between a source device and a sink device in a DisplayPort interface system, consistent with some embodiments.

FIG. 4 is a flowchart illustrating a method of transmitting USB data between a source device and a sink device in a DisplayPort interface system, consistent with some embodiments. Although the method illustrated in FIG. 4 may be used for the transmission of USB data at a data rate conforming to the USB revision 3.0 specification, as discussed above, the method may be used for the transmission of other USB revision specifications and other data transmission standards. For the purpose of illustration, the method illustrated in FIG. 4 will be discussed in conjunction with the system shown in FIG. 3. Source device 302 receives instructions to transmit USB data between source device 302 and sink device 306 (402). Consistent with some embodiments, the received instruction may be stored or written in register 318. Further consistent with some embodiments, register 318 may correspond to a DisplayPort Configuration Data (DPCD) register. Upon receiving the instruction to transmit USB data, source device 302 begins transmitting the USB data to sink device 306 over one main link line 316 (404). The remaining main link lines 316 may continue to transmit other data and signals, such as audio and video data and signals. To facilitate communication of USB data between sink device 306 and source device 304, fast auxiliary line 312 is utilized such that USB data may be transmitted from sink device 306 to source device 302 (406). In order to transmit the USB data over fast auxiliary line 312 at a data rate that conforms to the USB 3.0 specification, the USB data transmission is unidirectional and full duplex. That is, no other data or signals are transmitted along fast auxiliary line 312 when used for USB data transmission.

System 300 continues to utilize main link line 316 and fast auxiliary line 312 for USB data transmission until an interrupt signal is received at source controller 304 and written into register 318 (408). Consistent with some embodiments, the interrupt signal may be triggered from the sink controller 308 according to certain data transmission protocols. Consistent with some embodiments, the interrupt signal may correspond to a Hot Plug Detect (HPD) signal transmitted along interrupt link 314. Once the interrupt signal has been received by source controller 304, source controller 304 stops the USB data transmission (410). Consistent with some embodiments, further instructions may then be received at source controller 304 to reconfigure main link line 316 to again transmit audio and video data. Consistent with other embodiments, main link line 316 may be permanently configured to transmit USB data from source device 302 to sink device 306.

Figure 5:
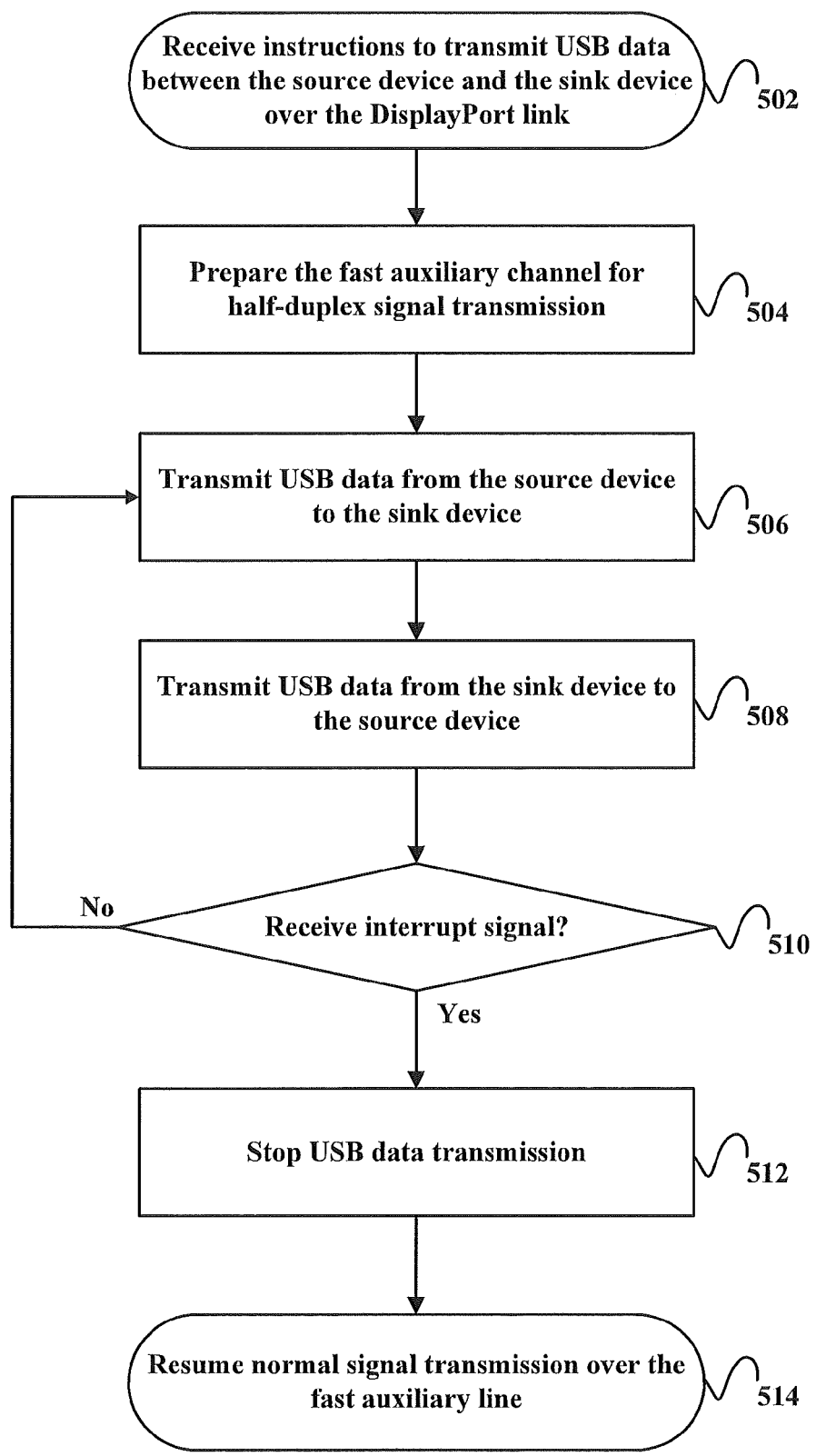
FIG. 5 is a flowchart illustrating a method of transmitting USB data between a source device and a sink device in a DisplayPort interface system, consistent with some embodiments.

FIG. 5 is a flowchart illustrating a method of transmitting USB data between a source device and a sink device in a DisplayPort interface system, consistent with some embodiments. Although the method illustrated in FIG. 5 may be used for the transmission of USB data at a data rate conforming to the USB revision 3.0 specification, as discussed above, the method may be used for the transmission of other USB revision specification and other data transmission standards. For the purpose of illustration, the method illustrated in FIG. 5 will be discussed in conjunction with the system shown in FIG. 3. The method illustrated in FIG. 5 is similar to the method illustrated in FIG. 4, but does not use unidirectional main link line 316 for the transmission of USB data. Instead, half-duplex unidirectional data transmission is performed on bidirectional fast auxiliary line 312 such that data is alternatingly transmitted between source device 302 and sink device 306. Source device 302 receives instructions to transmit USB data between source device 302 and sink device 306 (502). Consistent with some embodiments, the received instruction may be stored or written in register 318. Further consistent with some embodiments, register 318 may correspond to a DisplayPort Configuration Data (DPCD) register.

Upon receiving the instruction to transmit USB data, source controller 304 prepares fast auxiliary line 312 for unidirectional half-duplex data transmission (504). USB data may then be transmitted from source device 302 to sink device 306 over fast auxiliary line 312 (506). The data transmission may be performed at a data rate conforming to USB revision 3.0 specification. USB data may then be transmitted from sink device 306 to source device 302 over fast auxiliary line 312 (508). The alternating USB data transmission between source device 302 and sink device 306, and vice versa, over fast auxiliary line 312 until an interrupt signal is received at source controller 304 and written into register 318 (510). Consistent with some embodiments, the interrupt signal may correspond to a Hot Plug Detect (HPD) signal transmitted along interrupt link 314. Once the interrupt signal has been received by source controller 304, source controller 304 stops the USB data transmission (512). After the USB data transmission has been stopped, the system resumes its normal data transmission (512) such that fast auxiliary channel bidirectionally transmits data in a half-duplex mode (514).

Figure 6:
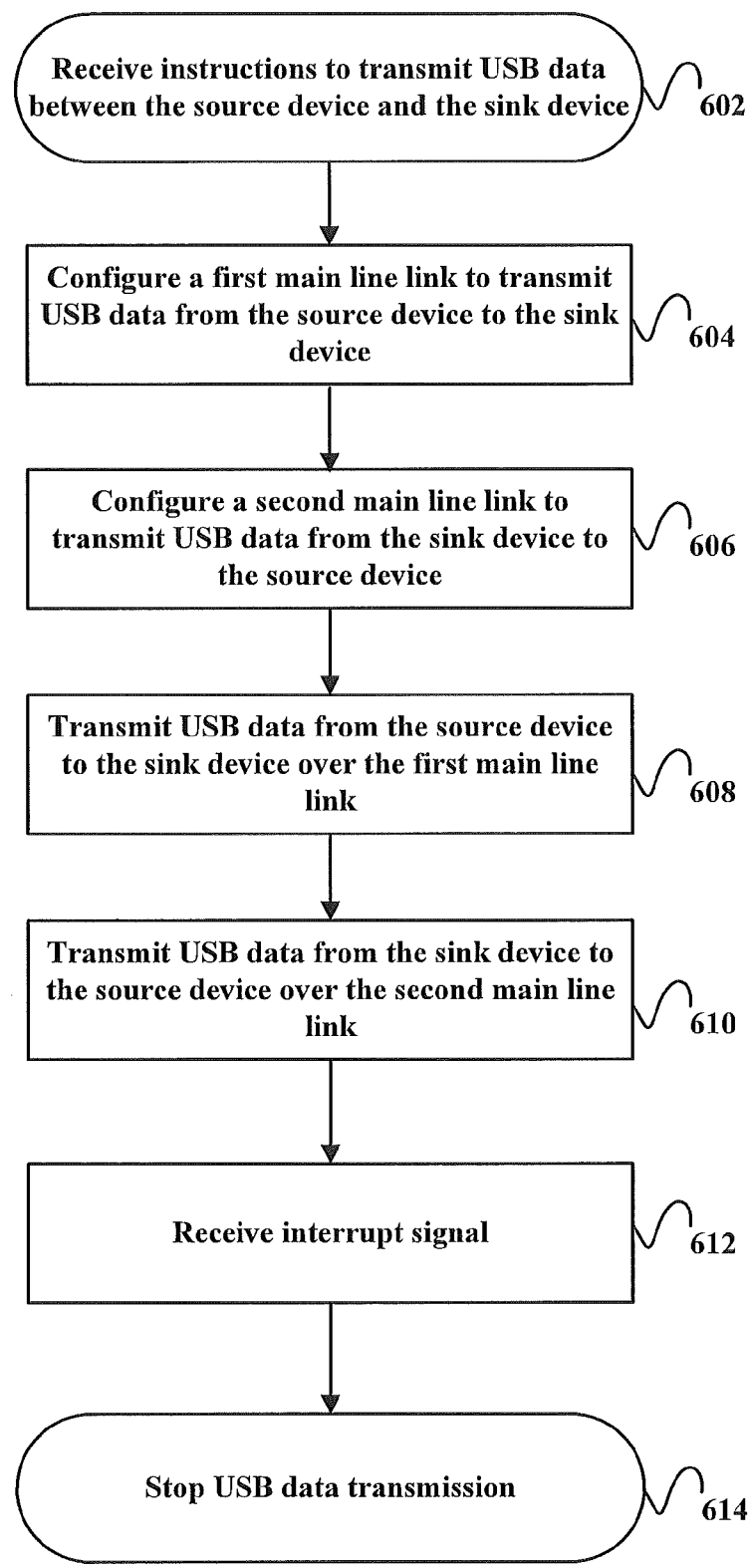
FIG. 6 is a flowchart illustrating a method of transmitting USB data between a source device and a sink device in a DisplayPort interface system, consistent with some embodiments.

FIG. 6 is a flowchart illustrating a method of transmitting USB data between a source device and a sink device in a DisplayPort interface system, consistent with some embodiments. Although the method illustrated in FIG. 6 may be used for the transmission of USB data at a data rate conforming to the USB revision 3.0 specification, as discussed above, the method may be used for the transmission of other USB revision specifications and other data transmission standards. For the purpose of illustration, the method illustrated in FIG. 6 will be discussed in conjunction with the system shown in FIG. 3. Source device 302 receives instructions to transmit USB data between source device 302 and sink device 306 (602). Consistent with some embodiments, the received instruction may be stored or written in register 318. Further consistent with some embodiments, register 318 may correspond to a DisplayPort Configuration Data (DPCD) register. Upon receiving the instruction to transmit USB data, source device controller 304 and sink device controller 308 begin reconfiguring a first main link line 316 to transmit USB data from source device 302 to sink device 306 (604). Source device controller 304 and sink device controller 308 then reconfigure a second main link line 316 to transmit USB data from sink device 306 to source device 302 (606). Consistent with some embodiments, the reconfiguration of the second main link line 316 may include reversing the direction of data flow of the second main link line 316 so that the second main link line 316 is configured to transmit data from sink device 306 to source device 304. Source device 302 then begins transmitting the USB data to sink device 306 over the first main link line 316 (608), and sink device 306 begins transmitting the USB data to source device 302 over the second main link line 316 (610). The remaining main link lines 316 may continue to transmit other data and signals, such as audio and video data and signals. Consistent with some embodiments, the remaining main link lines 316 may be configured by source device controller 304 and/or sink device controller 308 such that the transmission data rate of these remaining main link lines 316 are increased. Increasing the data rate may allow the remaining main link lines 316 to compensate for the loss of the first and second main link lines 316 being used for data transmission.

System 300 continues to utilize the first and second main link line 316 for USB data transmission until an interrupt signal is received at source device controller 304 and written into register 318 (612). Consistent with some embodiments, the interrupt signal may correspond to a Hot Plug Detect (HPD) signal transmitted along interrupt link 314. Once the interrupt signal has been received by source controller 304, source controller 304 stops the USB data transmission (614). Consistent with some embodiments, source device controller 304 may not receive an interrupt signal to stop data transfer. In such embodiments, the first and second main link lines 316 are configured for USB data transmission and may continue to transmit USB data along first and second main link lines 316 and may stop USB data transmission when instructed according to other protocols.

Consistent with embodiments described herein, a system and method are provided that allow for data to be transmitted over a link or connection that normally at data rates that are faster than the standard data rate that data is normally transmitted over the link or connection. The systems and methods may configure links or channels within the link or connection to operate in a specific manner in order to transmit the data at the faster data rate. In particular, the systems and methods provided herein may facilitate the transmission of USB data over a DisplayPort link. In some embodiments, the systems and methods provided herein allow USB revision 3.0 data to be transmitted over a DisplayPort link. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A method of transmitting data between a source device coupled to a sink device comprising:
    transmitting data from the source device to the sink device at a first standard data rate over a unidirectional main link comprising a plurality of main link lines;
    receiving, while transmitting data from the source device to the sink device at the first standard data rate, data from the sink device at the source device at a second standard data rate over a bidirectional auxiliary line that is physically separate from the unidirectional main line, wherein the second standard data rate is slower than the first standard data rate;
    receiving, at the source device, a first instruction to transmit data between the source device and the sink device at a modified data rate;
    transmitting, after receiving the first instruction, data from the source device to the sink device at the modified data rate over a main link line of the plurality of main link lines, wherein the modified data rate is slower than the first standard data rate; and
    receiving, after receiving the first instruction and while transmitting data to the sink device over the main link line, data from the sink device at the source device at the modified data rate over the bidirectional auxiliary line, wherein the modified data rate is faster than the second standard data rate.

2. The method of claim 1, wherein the main link line comprises a portion of a DisplayPort connection, the bidirectional auxiliary line comprises a fast auxiliary line of the DisplayPort connection, and the first standard data rate and the second standard data rate are specified by a DisplayPort specification.

3. The method of claim 1, wherein the modified data rate corresponds to a data rate associated with a Universal Serial Bus (USB) revision 3.0 standard.

4. The method of claim 1, wherein the first instruction comprises a write to a DisplayPort Configuration Data (DPCD) register.

5. The method of claim 1, further comprising:
    receiving, at the source device, a second instruction to stop data transmission between the source device and the sink device.

6. The method of claim 5, wherein the second instruction comprises a Hot Plug Detect (HPD) interrupt signal.

7. The method of claim 5, further comprising:
    while transmitting data from the source device to the sink device at the modified data rate over the main link line of the plurality of main link lines, and
    while receiving data from the sink device at the source device at the modified data rate over the bidirectional auxiliary line,
    transmitting, on other main link lines of the plurality of main link lines, audio and video data from the source device to the sink device at the first standard data rate.

8. A method for transmitting Universal Serial Bus (USB) data over a DisplayPort link coupling a sink device to a source device, comprising:
    transmitting data from the source device to the sink device at a first DisplayPort standard data rate over a DisplayPort link comprising a plurality of main link lines and a bidirectional auxiliary line that is physically separate from the plurality of main link lines;
    receiving, while transmitting data from the source device to the sink device at the first standard data rate, data from the sink device at the source device at a second DisplayPort standard data rate over the bidirectional auxiliary line, wherein the second DisplayPort standard data rate is slower than the first DisplayPort standard data rate;
    receiving a first instruction at the source device to transmit the USB data over the DisplayPort link;
    transmitting, after receiving the first instruction, the USB data over the bidirectional auxiliary line of the DisplayPort link from the source device to the sink device at a modified data rate, wherein the modified data rate is faster than the second DisplayPort standard data rate; and
    receiving, after receiving the first instruction, the USB data over the bidirectional auxiliary line from the sink device at the source device at the modified data rate,
    wherein the USB data transmission between the source device and the sink device comprises alternating half-duplex unidirectional transmission.

9. The method of claim 8, wherein the modified data rate corresponds to a data rate associated with a USB revision 3.0 standard.

10. The method of claim 8, wherein the first instruction comprises a write to a DisplayPort Configuration Data (DPCD) register.

11. The method of claim 8, further comprising receiving, at the source device, a second instruction to stop transmission between the source device and the sink device at the modified data rate, wherein the second instruction comprises a Hot Plug Detect (HPD) interrupt signal.

12. A data transmission system, comprising:
    a source device comprising a source device controller having a register populated with a first instruction;
    a sink device comprising a sink device controller; and
    a transmission link coupling the source device and the sink device, the transmission link comprising:
        a unidirectional interrupt line;
        a unidirectional main line comprising a plurality of main link lines and configured to transmit data at a first standard data rate before the register is populated with the first instruction;
        a bidirectional auxiliary line that is physically separate from the unidirectional main line and configured to transmit data between the source device and the sink device at a second standard data rate before the register is populated with the first instruction, wherein the second standard data rate is slower than the first standard data rate, and wherein the transmission link is configured by the source device controller, in response to population of the register with the first instruction, to transmit data from the source device to the sink device over one of the plurality of main link lines at a modified data rate and to transmit, while transmitting data from the source device to the sink device over one of the plurality of main link lines, data from the sink device to the source device over the bidirectional auxiliary line at the modified data rate; and wherein the modified data rate is slower than the first standard data rate and faster than the second standard data rate.

13. The system of claim 12, wherein the modified data rate corresponds to a data rate associated with a Universal Serial Bus revision 3.0 standard.

14. The system of claim 12, wherein the data transmission system comprises a DisplayPort data transmission system.

15. The system of claim 14, wherein audio/video data is transmitted between the source device and the sink device over the remaining main link lines while data is being transmitted from the source device to the sink device over the one of the plurality of main link lines at the modified data rate and while data is being transmitted from the sink device to the source device over the bidirectional auxiliary line at the modified data rate.

16. The system of claim 13, wherein the transmission link is configured by the source device controller to stop transmission of data from the source device to the sink device at the modified data rate in response to a second instruction written in the register.

17. The system of claim 16, wherein the second instruction comprises a Hot Plug Detect (HPD) interrupt signal.

18. The system of claim 12, wherein the data transmission system is configured by the source device controller to only transmit data from the sink device to the source device at the modified data rate over the bidirectional auxiliary line.

19. A data transmission system, comprising:
a source device comprising a source device controller having a DisplayPort Configuration Data (DPCD) register populated with a first instruction;
a sink device comprising a sink device controller; and
a transmission link coupling the source device and the sink device, the transmission link comprising:
a DisplayPort (DP) unidirectional interrupt line
a DP main line comprising a plurality of main link lines including a first main link line and a second main link line, wherein the each of plurality of main link lines are configured to transmit data in a data transmission direction from the source device to the sink device at a first standard data rate before the DPCD register is populated with the first instruction;
a DP bidirectional auxiliary line that is physically separate from the DP main line and configured to transmit data between the source device and the sink device at a second standard data rate,
wherein the data transmission direction of the second main link line is reversed in response to population of the DPCD register with the first instruction,
wherein the transmission link is configured by the source device controller, in response to population of the DPCD register with the first instruction, to transmit Universal Serial Bus (USB) data from the source device to the sink device over the first main link line at a modified data rate and to transmit USB data from the sink device to the source device over the second main link line at the modified data rate, and
wherein the modified data rate is slower than the standard data rate.

20. The system of claim 19, wherein the data transmission system comprises a DisplayPort data transmission system and the modified data rate corresponds to a USB revision 3.0 standard.

21. The system of claim 19, wherein the transmission link is configured to stop data transmission between the source device and the sink device in response to a second instruction written in the DPCD register.

22. The system of claim 21, wherein the second instruction comprises a Hot Plug Detect (HPD) interrupt signal transmitted over the DP unidirectional interrupt line.

23. The system of claim 19, wherein the plurality of main link lines other than the first and second main link lines are configured by the source device controller and the sink device controller to transmit data at a higher data rate than the first standard data rate associated with the plurality of main link lines while data is being transmitted from the source device to the sink device at the modified data rate over the first main link line and while data is being transmitted from the sink device to the source device at the modified data rate over the second main link line.

24. The system of claim 19, wherein the plurality of main link lines other than the first and second main link lines transmit audio/video data from the source device to the sink device.

* * * * *